O. HESSE.
Fishing Apparatus.
No. 202,818. Patented April 23, 1878.
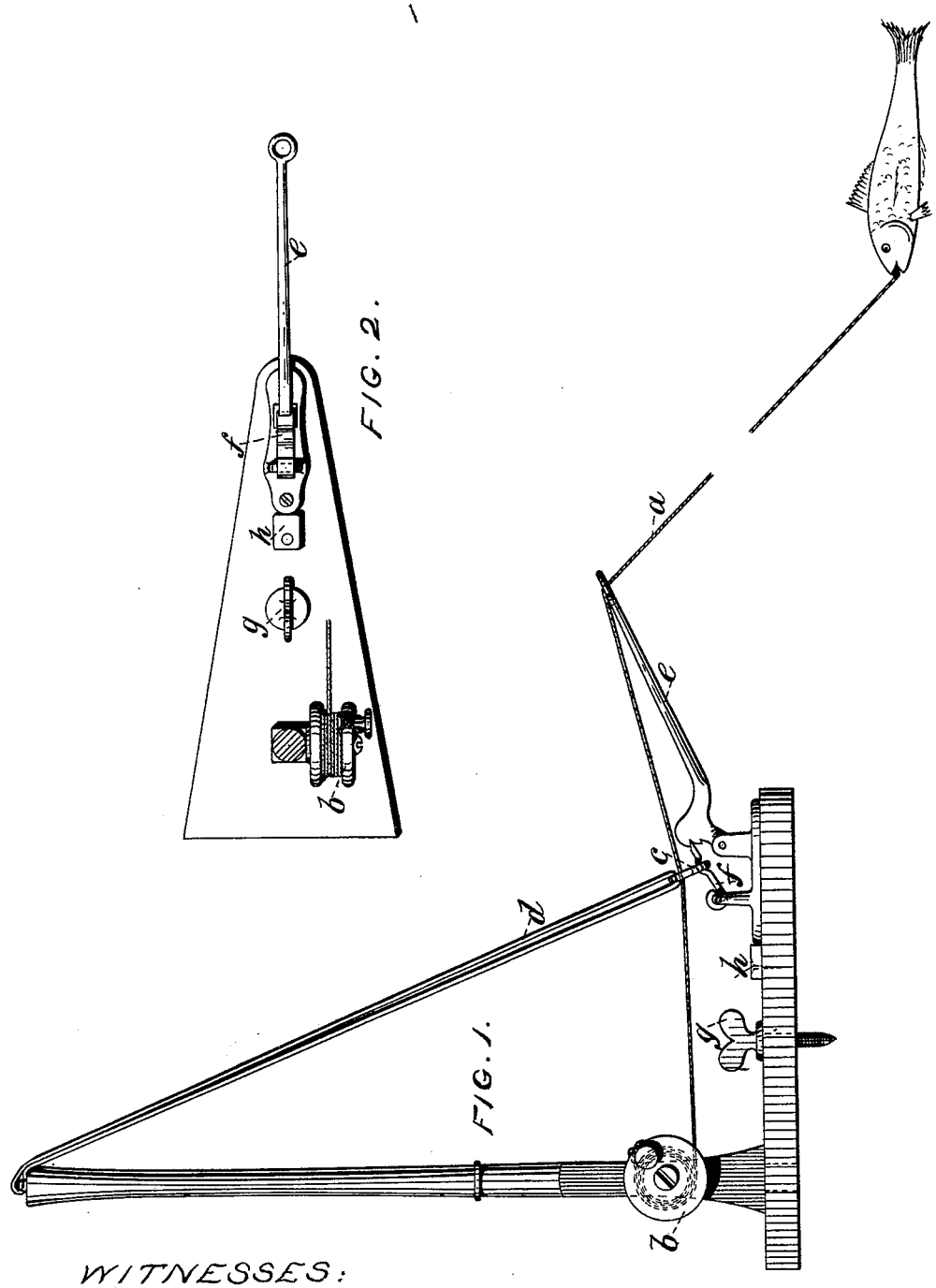
WITNESSES:
P. H. Vernon
Wm Kemble Hall.
Oscar Hesse
INVENTOR.

UNITED STATES PATENT OFFICE.

OSCAR HESSE, OF WEST HOBOKEN, NEW JERSEY.

IMPROVEMENT IN FISHING APPARATUS.

Specification forming part of Letters Patent No. 202,818, dated April 23, 1878; application filed December 26, 1877.

*To all whom it may concern:*

Be it known that I, OSCAR HESSE, of West Hoboken, in the county of Hudson and State of New Jersey, have invented a new and useful Improvement in Spring Fishing Apparatus, of which the following is a specification:

The object of the said invention is to hook a fish that disturbs the bait, either directly or after a determined amount of the line shall have been drawn from the reel. To accomplish this object the line is rove through a ring on a stretched spring, which is held by a trigger, that is released to jerk the line and hook the fish when he draws upon the bait. A stop upon the reel determines the amount of the line that can be carried out by the fish before the strain will spring the trigger, and the position and depth of the notch in the lever by which the trigger is held determines the amount of the strain required to release the spring and apply its power to the line. As the line remains in the ring carried by the spring, the elasticity of the spring continues to be opposed to the struggles of the fish, and yields to the strain consequent upon his more violent efforts to escape.

To enable others skilled in the arts to which it appertains to make and use my invention, I will proceed to describe its construction and operation with reference to the drawing.

Figure 1 is a side elevation of the said apparatus set ready for action, and Fig. 2 is a plan of the base of the same.

The line $a$ is wound on the reel $b$, and runs through the ring $c$, that is carried by the spring $d$, and also through the eye at the end of the lever $e$, that holds the loose end of the trigger $f$. When the outer end of the line is drawn upon, the lever is depressed, the trigger is released, and the ring and the line jerked up by the spring.

When it may be desired to have a portion of the line run out before applying the jerk of the spring, a hitch or turn may be taken around the handle of the reel with a loop of the line, and the line then reeled up the required distance, so that the outer end may be drawn upon and the line unreeled until it is stopped by the hitch on the handle, when the strain releases the trigger and spring, and brings the jerk upon the line.

The hand-screw $g$ serves to secure the apparatus in place. The piece of india-rubber $h$ catches the end of the trigger when it is thrown violently back by the force of the spring. It will be observed that there are two notches made in the butt of the lever $e$ for the reception of the end of the trigger, the upper one of which is more sensitive and made to work more easily than the lower. I prefer to use an india-rubber spring like that shown in the drawing; but a spiral or other spring may be employed.

I do not claim the combination of a lever and trigger with a spring to jerk the line when the latter is pulled upon.

I claim—

In a spring fishing apparatus, the combination of the lever $e$, provided with two or more notches, the trigger $f$, and spring $d$, with the line $a$ and the reel $b$, substantially as described.

OSCAR HESSE.

Witnesses:
P. H. VERNON,
WM. KEMBLE HALL.